(12) United States Patent  
Clements

(10) Patent No.: US 7,585,343 B2
(45) Date of Patent: Sep. 8, 2009

(54) FILTER CLEANING SYSTEM AND METHOD

(75) Inventor: Jack Thomas Clements, Lee's Summit, MO (US)

(73) Assignee: General Electric Company, Schenectady, NY (US)

( * ) Notice: Subject to any disclaimer, the term of this patent is extended or adjusted under 35 U.S.C. 154(b) by 437 days.

(21) Appl. No.: 11/586,032

(22) Filed: Oct. 25, 2006

(65) Prior Publication Data

US 2008/0022856 A1    Jan. 31, 2008

Related U.S. Application Data

(63) Continuation-in-part of application No. 11/493,237, filed on Jul. 26, 2006.

(51) Int. Cl.
*B01D 46/04* (2006.01)

(52) U.S. Cl. .......................................... 55/302; 95/280

(58) Field of Classification Search ............... 55/294, 55/302, 295; 95/273, 279, 280; 210/791, 210/797, 798, 333.01, 411
See application file for complete search history.

(56) References Cited

U.S. PATENT DOCUMENTS

| | | | | |
|---|---|---|---|---|
| 4,280,826 A * | 7/1981 | Johnson, Jr. | ............... | 55/302 |
| 4,504,288 A * | 3/1985 | Kreft | ............... | 55/302 |
| 4,539,025 A * | 9/1985 | Ciliberti et al. | ............... | 55/302 |
| 4,731,100 A * | 3/1988 | Loeffelmann et al. | ......... | 95/281 |
| 4,836,834 A * | 6/1989 | Steele | ............... | 95/279 |
| 5,002,594 A * | 3/1991 | Merritt | ............... | 55/302 |
| 5,199,965 A * | 4/1993 | van Ackeren | ............... | 55/293 |
| 5,562,251 A | 10/1996 | Elliott | | |
| 5,887,797 A | 3/1999 | Elliott | | |
| 6,129,852 A | 10/2000 | Elliott | | |
| 6,749,665 B2 * | 6/2004 | Bjarno et al. | ............... | 95/20 |
| 2005/0120881 A1 | 6/2005 | Sporre et al. | | |
| 2006/0112667 A1 | 6/2006 | Sporre et al. | | |

* cited by examiner

*Primary Examiner*—Duane Smith
*Assistant Examiner*—Minh-Chau T Pham
(74) *Attorney, Agent, or Firm*—Greg Strugalski; Ernest G. Casick; Frank A. Landgraff

(57) ABSTRACT

A cleaning system for a gas turbine inlet filter mounted to a tubesheet. The filter defines an upstream side at which particulates are separated from a fluid stream passing through the filter and a downstream side substantially free of the particulates. The cleaning system includes a blowpipe for supplying a pressurized fluid. A one-piece nozzle is made from a tubular member having a substantially constant cross-section extending along the length of the member. The nozzle is permanently attached to the blowpipe at a first end portion. The nozzle is in fluid communication with the blowpipe to direct a cleaning pulse of the pressurized fluid from a second opposite end portion into the downstream side of the filter to dislodge particulates into the upstream side. An aspirator is formed in the nozzle at an upstream location spaced from the second end portion of the nozzle. The aspirator enables an additional volume of fluid to be delivered from the second end portion of the nozzle than is delivered from the blowpipe to the first end portion of the nozzle. A diffuser is fixed to at least one of the blowpipe and the nozzle. The diffuser directs a portion of the cleaning pulse to a proximal portion of the filter located adjacent to the tubesheet.

19 Claims, 8 Drawing Sheets

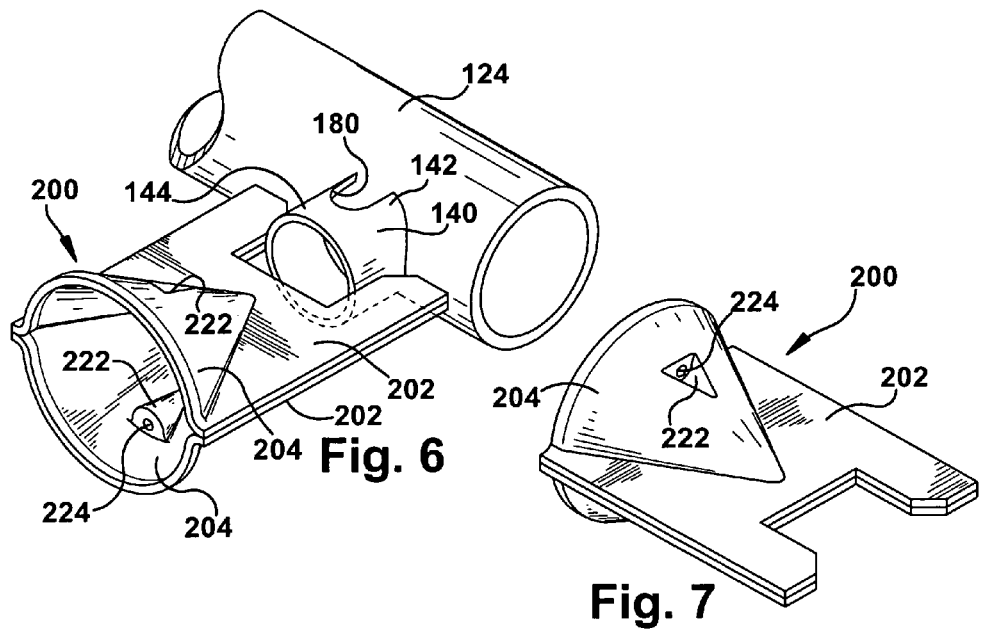
Fig. 6
Fig. 7
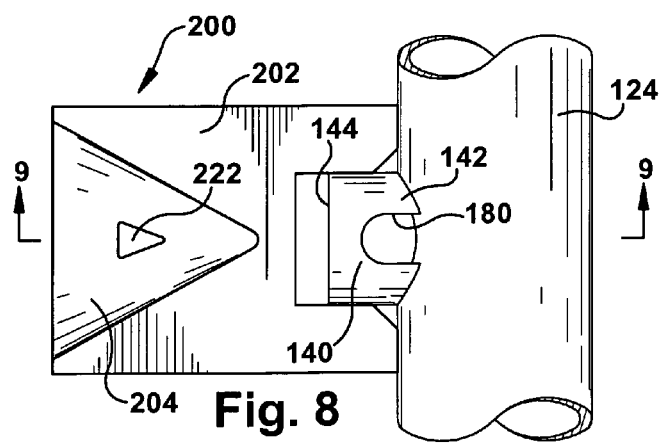
Fig. 8
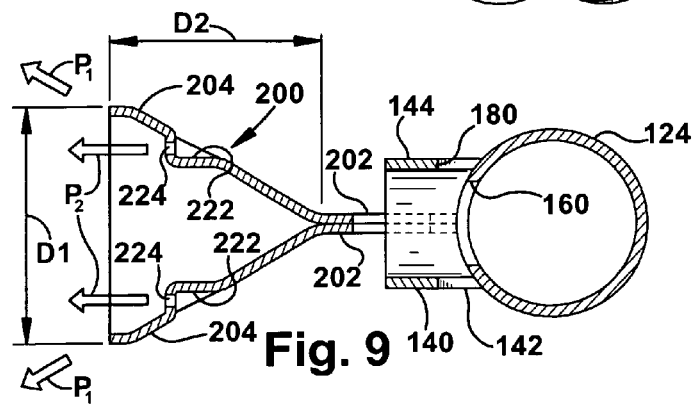
Fig. 9

FILTER CLEANING SYSTEM AND METHOD

CROSS REFERENCE TO RELATED APPLICATIONS

This application is a continuation-in-part of Ser. No. 11/493,237 filed Jul. 26, 2006, which is incorporated by reference.

BACKGROUND OF THE INVENTION

1. Field of the Invention

The invention generally relates to a system and method for cleaning a filter. In particular, the invention relates to a system and method for reverse pulse-jet cleaning of filters in an inlet housing of a gas turbine.

2. Description of the Prior Art

It is known that fabric filters are used to separate particulates from flowing fluids. The particulates tend to accumulate on and in the media of the filters over time. This particulate accumulation increases resistance to flow through the filters. Increased resistance to flow is undesirable because it inhibits fluid flow through the filters and/or requires more power to effect flow through the filters.

In some known systems, reverse pulse-jet cleaning is used to periodically remove accumulated particulates from the media of the filter. Using reverse pulse-jet cleaning increases the service life of the filter by removing accumulated particulates to decrease the resistance to fluid flow and thereby allow increased fluid flow through the filters.

A filter is generally in the form of an elongated cylindrical cartridge or a bag with a rectangular cross-section and is supported by a tubesheet. The filter is open at one end and closed at the other. A known disadvantage of cleaning with known reverse pulse-jet cleaning systems is that a portion of the filter that is located closest to the tubesheet experiences little or no effective cleaning. Other portions of the filter tend to be cleaned to excess and may become damaged.

BRIEF DESCRIPTION OF THE INVENTION

The invention provides advantages over known filter cleaning systems by providing a more effective cleaning to all portions of the entire filter. One aspect of the invention is a cleaning system for use with a filter mounted to a tubesheet. The filter defines an upstream side at which particulates are separated from a fluid stream passing through the filter and collected. The filter also defines downstream side that is substantially free of the particulates. The cleaning system includes a blowpipe for supplying a pressurized fluid. A one-piece nozzle is made from a tubular member with a substantially constant cross-section extending along the length of the tubular member. The nozzle is attached to the blowpipe at a first end portion. The nozzle is in fluid communication with the blowpipe. The nozzle directs a cleaning pulse of the pressurized fluid from a second opposite end portion into the downstream side of the filter to dislodge particulates from the upstream side. An aspirator is located upstream and spaced from the second end portion of the nozzle. The aspirator enables an additional volume of fluid to be delivered from the second end portion of the nozzle than is delivered from the blowpipe to the first end portion of the nozzle. A diffuser directs a portion of the cleaning pulse to a proximal portion of the filter located adjacent to the tubesheet.

Another aspect of the invention is a method of cleaning a gas turbine inlet filter mounted to a tubesheet. The filter defines an upstream side at which particulates are separated from a fluid stream passing through the filter. The filter also defines a downstream side substantially free of the particulates. The method comprises the steps of supplying pressurized fluid in a blowpipe. The method includes directing a portion of the pressurized fluid from an outlet end portion of a nozzle into the downstream side of the filter to dislodge particles from the upstream side. The nozzle is one-piece and made from a tubular member having a substantially constant cross-section extending along the length of the tubular member. The nozzle is permanently attached to the blowpipe at an opposite inlet end portion. The nozzle is in fluid communication with the blowpipe. The method also includes delivering a cleaning pulse from the nozzle to the downstream side of the filter to dislodge particulates from the upstream side. The cleaning pulse comprises fluid that is directed to the nozzle from the blowpipe and an additional volume of fluid through an aspirator. The aspirator is formed in the nozzle at an end portion of the nozzle adjacent the blowpipe. The method further includes diffusing a portion of the cleaning pulse to a proximal portion of the filter located adjacent to the tubesheet.

BRIEF DESCRIPTION OF THE DRAWINGS

Further features of the invention will become apparent to those skilled in the art to which the invention relates from reading the following description with reference to the accompanying drawings, in which:

FIG. 6 is an enlarged perspective view of a nozzle and diffuser of the filter cleaning system according to one aspect of the invention;

FIG. 7 is an enlarged perspective view of the diffuser illustrated in FIG. 6;

FIG. 8 is a plan view of the nozzle and diffuser illustrated in FIG. 6;

FIG. 9 is a cross-sectional view of the nozzle and diffuser illustrated in FIG. 8, taken approximately along line 9-9 in FIG. 8;

DETAILED DESCRIPTION OF THE INVENTION

The system and method of cleaning a filter are described below by way of example and not limitation. The system and method are useable with a variety of filters. FIGS. 1 through 5 depict an exemplary fabric filter. The exemplary fabric filter illustrated is particularly suitable for use in a gas turbine intake filter system 20.

Figure 1:
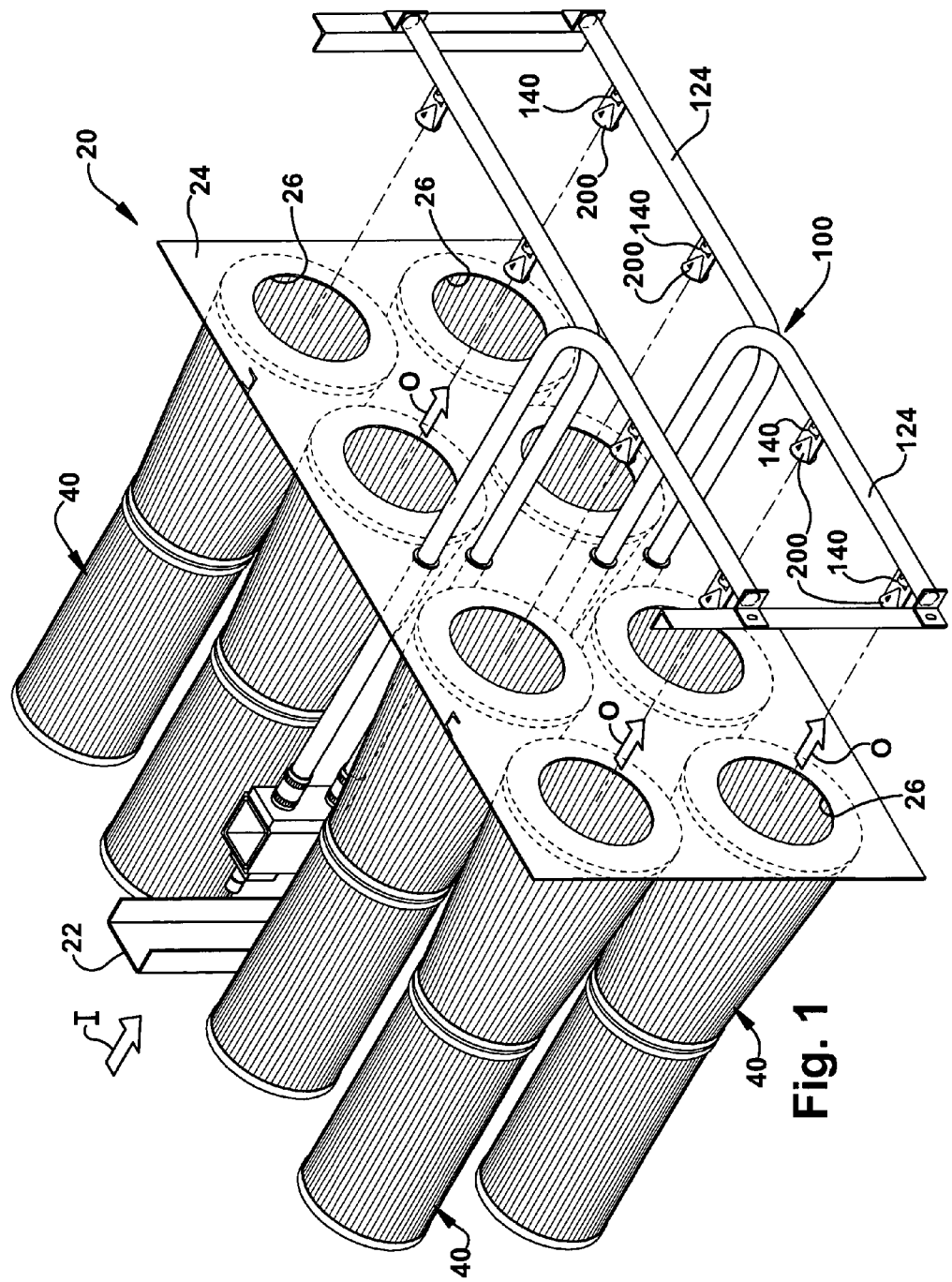
FIG. 1 is a perspective view, taken from the outlet or downstream side of a portion of a gas turbine intake filter system having a filter cleaning system according to one aspect of the invention.
Figure 2:
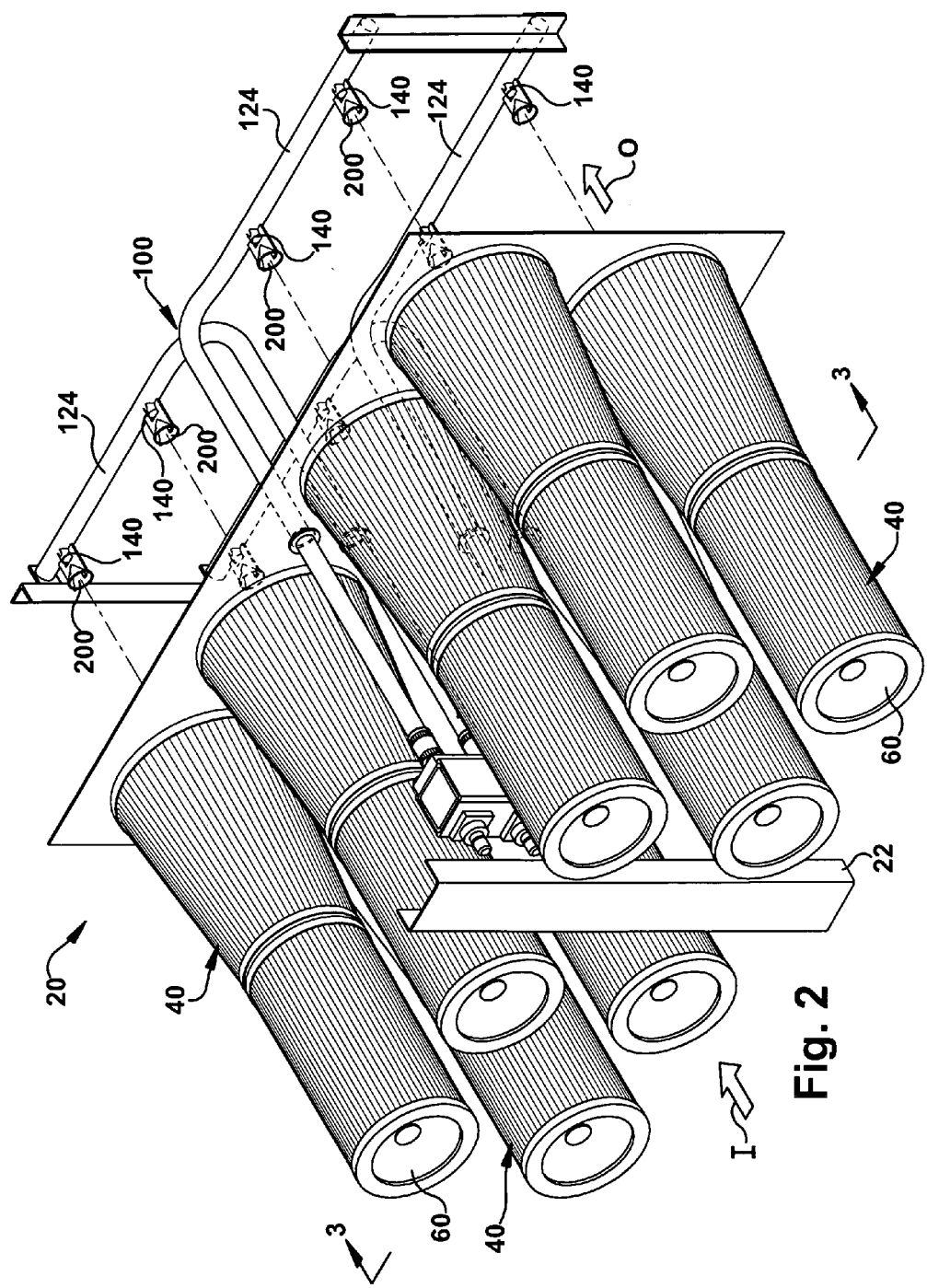
FIG. 2 is a perspective view, taken from the inlet or upstream side of a portion of the gas turbine intake filter system.

In FIGS. 1-2, particulate-laden fluid, such as air, is drawn into the gas turbine intake filter system 20 in the direction indicated generally by the arrow I. The gas turbine intake filter system 20 includes a housing (not shown) and a frame 22 that is used to support a tubesheet 24 and the housing. The tubesheet 24 includes a plurality of openings 26. The gas turbine intake filter system 20 includes a plurality of fabric filter 40 supported by the tubesheet 24. The filters 40 may be attached directly to the tubesheet 24 or indirectly connected with the tubesheet by intervening structure. The filters 40 are mounted adjacent to respective openings 26 at an upstream side of the tubesheet 24.

Air is cleaned by the fabric filters 40. The cleaned air flows downstream from the openings 26 in the tubesheet 24 as indicted by arrows O (FIG. 1) into a downstream use component, such as a gas turbine for power generation. Each of the illustrated fabric filters 40 includes at least one filter element 42, 44 positioned to clean the air before it is used by components located downstream of the filters.

Particulate laden air I to be cleaned flows through the filter elements 42, 44. The filter elements 42, 44 are positioned in air flow communication with an opening 26 in the tubesheet 24. The cleaned air O will flow through the opening 26 and then to downstream components.

Figure 4:
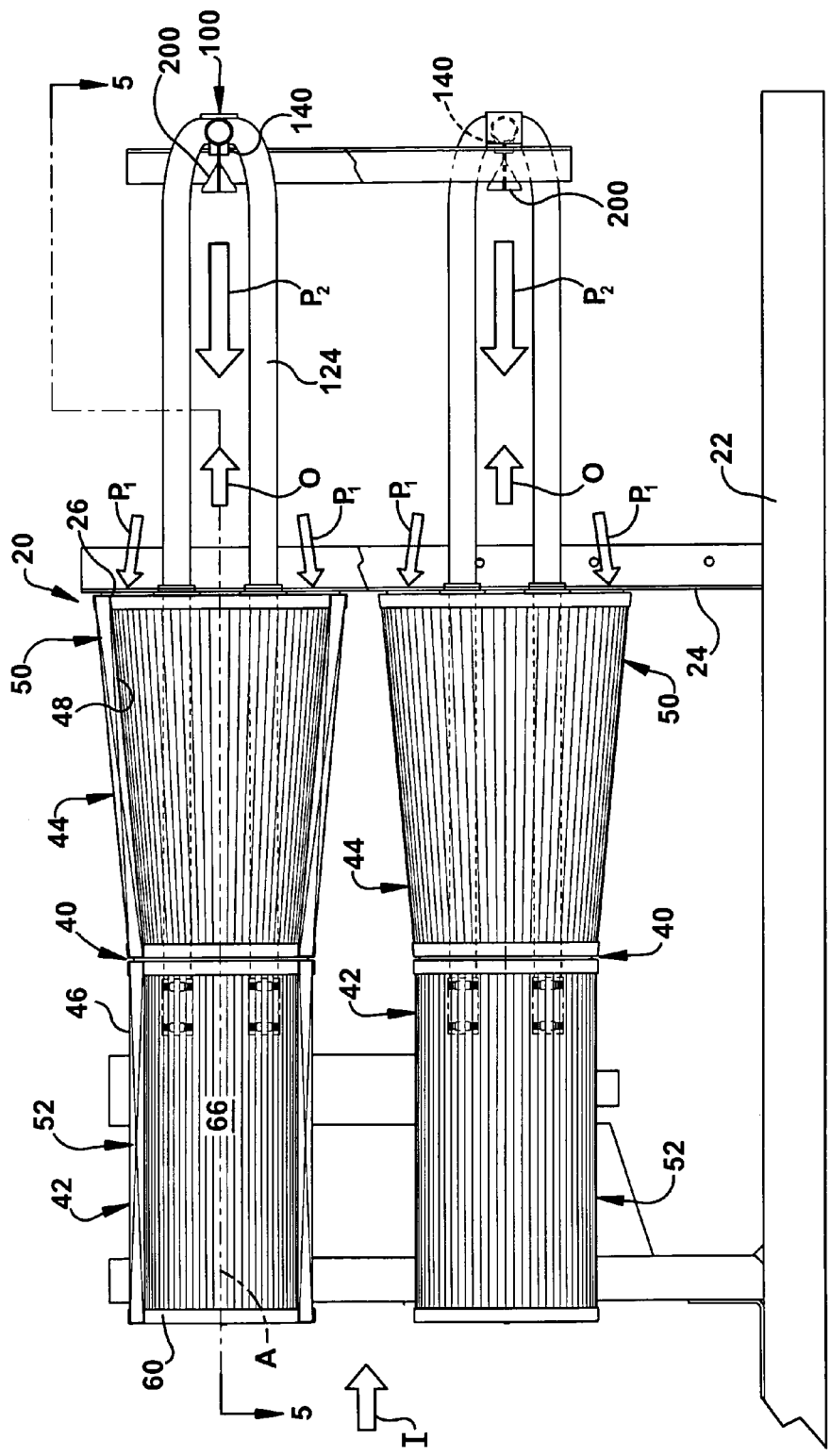
FIG. 4 is an elevational view, partly in section, of the portion of the gas turbine intake filter system taken approximately along the line 4-4 in FIG. 3.
Figure 5:
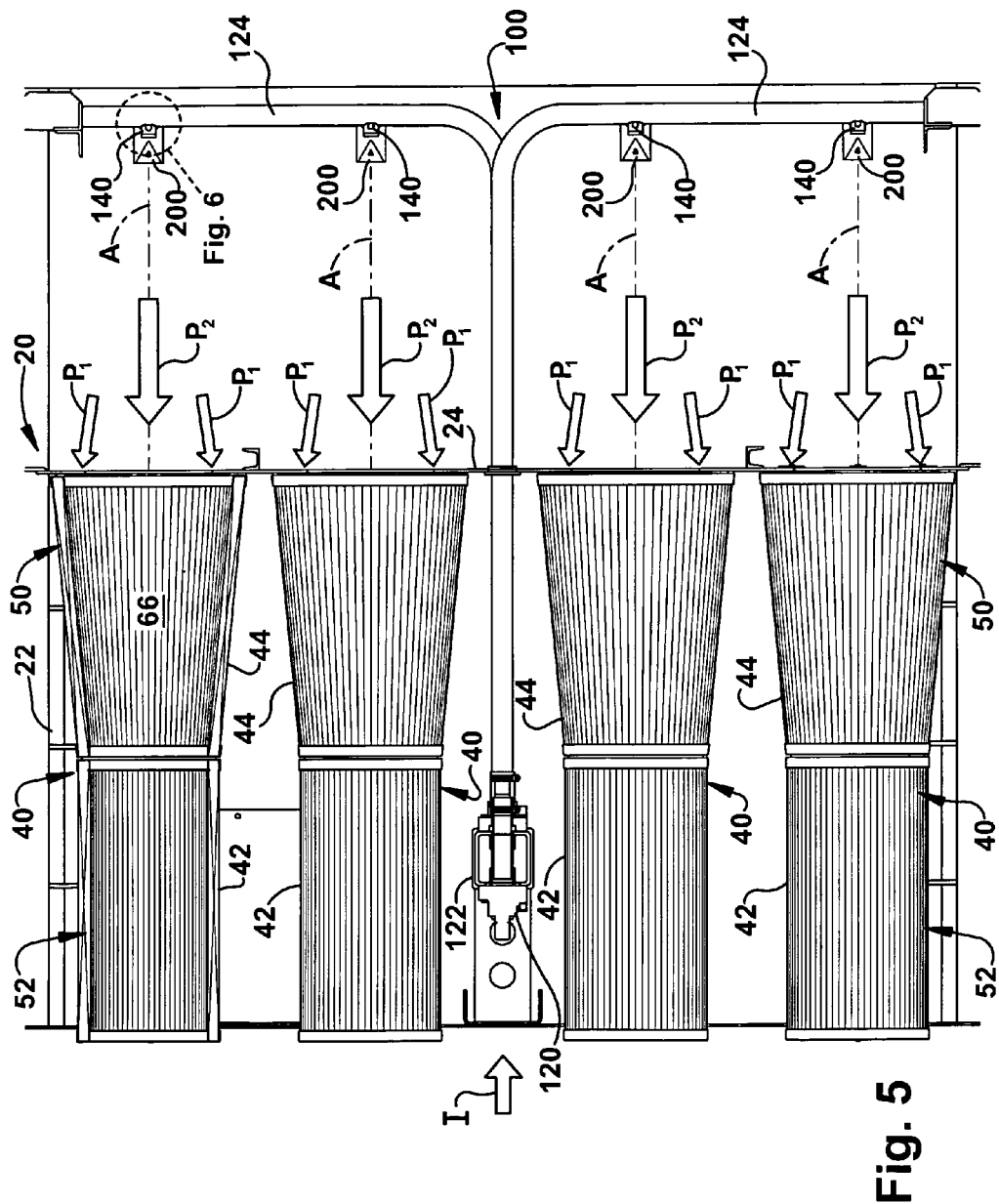
FIG. 5 is a top plan view, partly in section, of the portion of the gas turbine intake filter system, taken approximately along the line 5-5 in FIG. 4.
Figure 10:
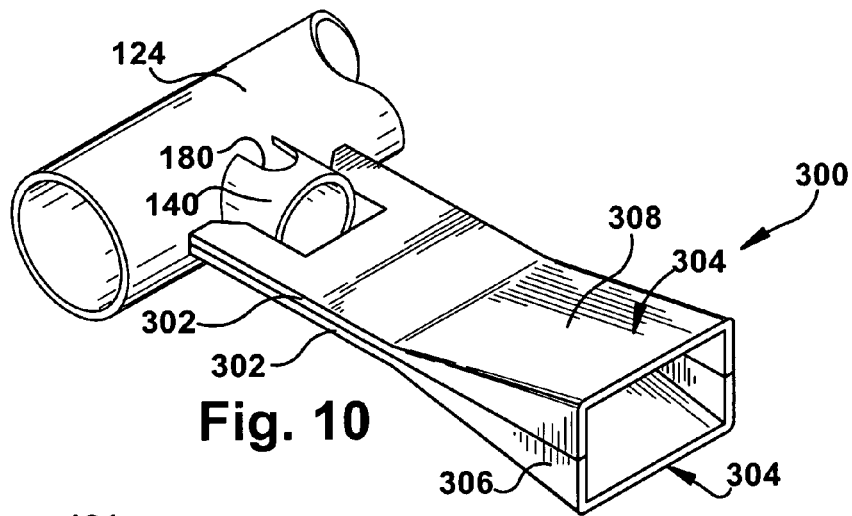
FIG. 10 is an enlarged perspective view of a nozzle and diffuser of the filter cleaning system according to another aspect of the invention.
Figure 11:
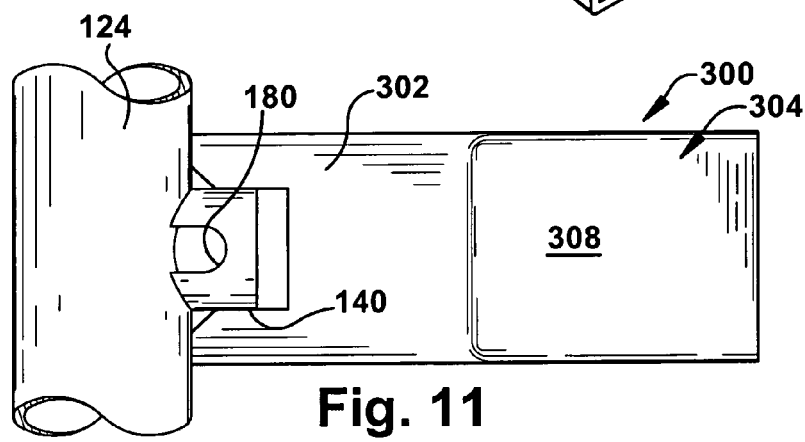
FIG. 11 is a plan view of the nozzle and diffuser illustrated in FIG. 10.
Figure 12:
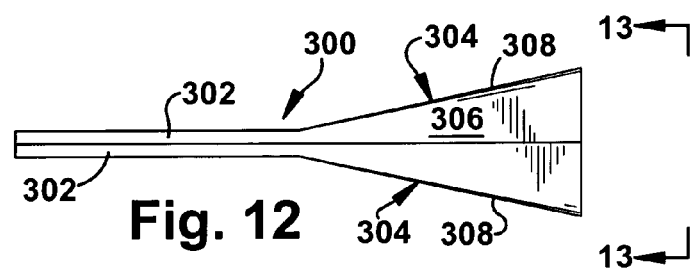
FIG. 12 is a side elevational view of the diffuser illustrated in FIG. 11.

Referring to FIGS. 4 and 5, each filter 40 includes at least a first filter element 42 and a second filter element 44 made from flexible and fluid-permeable fabric filter media material. Each of the first and second filter elements 42, 44 has an outer or upstream surface 46 (FIG. 4) and an inner or downstream surface 48. The first filter element 42 is tubular and has a cylindrical shape. The second filter element 44 is tubular and has a frusto-conical shape. It will be apparent that the filter 40 can be of any configuration and shape. For example, the filter 40 may be a bag that has a rectangular cross-section.

The filter elements 42, 44 are arranged in axial engagement. One end of the first filter element 42 is closed by a removable end cap 60. The filter elements 42, 44 are held in place by mounting structure (not shown) attached to the tubesheet 24 and the end cap 60. Each filter 40 defines a clean air plenum 66 by its downstream surface 48.

After a period of use, the pressure drop across each of the filters 40 will increase due to the particulates separated from the air stream and accumulated on and in the upstream side 46 the filter. These particulates can be harmful to downstream components, such as a gas turbine, if not removed from the air stream. The filters 40 are periodically cleaned by generating a reverse pulse-jet or cleaning pulse flow of relatively higher pressure fluid. The cleaning pulse is directed into the plenum 66 of each filter 40.

The cleaning pulse flows from the plenum 66 to the downstream side 48 of the filter 40 to the upstream side 46 of the filter. This cleaning pulse flow will remove at least some, and preferably a significant amount, of the particulates from the upstream side 46 of the filter 40 and reduce the restriction across the filter caused by particulates accumulated on or in the fabric filter media.

It is known that, when cleaning with known reverse pulse-jet cleaning systems, a portion 50 (FIG. 4) of the filter 40 that is located closest to the source of the cleaning pulse, in this case the tubesheet 24, experiences little or no effective cleaning. This results from particulates removed from portion 52 of the filter 40 spaced from the portion 50 become suspended in the fluid flow I after a cleaning pulse and deposited on the portion 50 located adjacent the tubesheet 24. The particulates deposited on the portion 50 of the filter 40 can become relatively thick so no air flow occurs through this portion of the filter affecting total flow through the intake filter system 20. The portion 52 of the filter 40 located away from the tubesheet 24 and portion 50 may tend to be cleaned to excess by the known cleaning pulses and may become damaged, thus, affecting the service life of the filter.

Referring to FIGS. 4-5, the reverse pulse-jet cleaning system 100 according to one aspect of the invention is illustrated. The reverse-jet cleaning pulse is provided by the cleaning system 100. Directing the cleaning pulse of compressed gas is done periodically into each filter 40 through the downstream surface 48. By "periodic", it is meant that the reverse pulse-jet system 100 can be programmed or can be manually operated such that at predetermined times, after a certain length of time or after a certain amount of restriction is detected, there will be a cleaning pulse of compressed gas directed into the clean air plenum 66 of by the filters 40.

In general, the reverse pulse-jet cleaning system 100 uses a cleaning pulse of a relatively higher pressure fluid than the pressure of the outlet flow O, such as pulses of compressed gas, for example air, to clean the filter 40. By "pulse", it is meant a flow of fluid at a pressure at least 25%, and preferably at least 50%, higher than the pressure of the outlet flow O through filter 40 for a limited time duration. The time duration is generally under 0.5 second, preferably under 0.3 second, and in some cases less than 0.05 second. It has been found that for certain applications, it is beneficial to direct the cleaning pulse of compressed gas at a force of between 2-3 inches of water and flow at a rate in the range of 200 to 3000 CFM net flow, with developed "reverse", or net reverse cleaning flow volume of 25% to 100% of outlet flow O from the filter 40. Preferably, the "net" reverse-air flow is at least 25 to 50% more than the normal outlet flow O of the filter 40 being cleaned.

Figure 3:
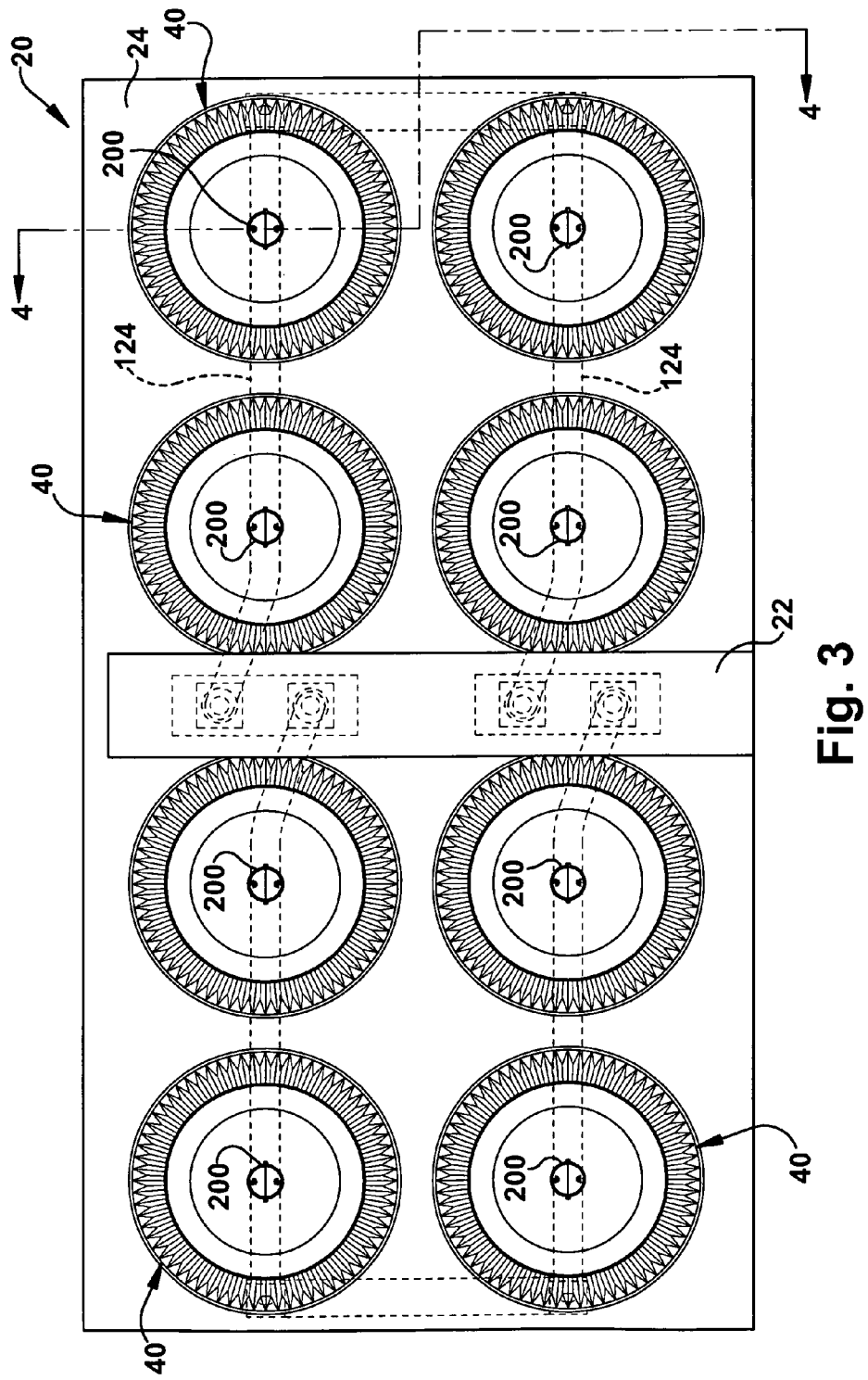
FIG. 3 is a cross-sectional view of the portion of the gas turbine intake filter system taken approximately along the line 3-3 in FIG. 2.

As best seen in FIG. 5, the reverse pulse-jet cleaning system 20 includes a plurality of pulse valves 120. Each valve 120 is operably connected to a compressed air manifold 122 that supplies compressed fluid, such as air. Each of the valves 120 is arranged to direct the compressed fluid through a respective blowpipe 124 and to a pair of nozzles 140. Periodically, the valves 120 are actuated to allow a cleaning pulse of compressed air to pass through the nozzles 140, through the openings 26 in the tubesheet 24, and into the clean air plenum 66 of the filter 40. The nozzles 140 are positioned a predetermined distance from the tubesheet 24 and located along the axis A of a respective filter 40, or centrally as illustrated in FIG. 3. The predetermined distance is the range of 8 inches to 36 inches, and preferably 20-31 inches when the diameter of the opening 26 in the tubesheet 24 is approximately 13 inches.

The blowpipe 124 is permanently secured to the tubesheet 24 or frame 22 by a clamp or bracket. The nozzle 140 of the reverse pulse-jet cleaning system 100 is permanently attached to the blowpipe 124, such as by welding. In the illustrated embodiment, the nozzle 140 is a fabricated from a metal tubular member and has a substantially constant circular cross-section extending along its length in a direction parallel to the longitudinal central axis A.

The nozzle 140 (FIG. 6) has a first end portion 142 and a second end portion 144. The nozzle 140 is welded to the blowpipe 124 at the first end portion 142 around an opening 160 (FIG. 9) in the blowpipe. The nozzle 140 defines a conduit for the primary fluid delivered from the blowpipe 124. The nozzle 140 also includes an aspirator 180 defined by a pair of equal size ports formed in the first end portion 142.

The nozzle 140 has a first area defined by an opening in the blowpipe 124 through which pressurized fluid may flow. The inner diameter of the nozzle 140 is substantially equal to or just slightly greater than the diameter of the opening 160. The aspirator 180 defines a second area through which extra or secondary aspirator fluid may flow. The ratio of the first area to the second area is in the range of 0.5:1 to 5.0:1 and preferably is in the range of 1.0:1 to 2.0:1.

The aspirator 180 draws additional air in by flowing through the nozzle 140 across the aspirator. The air flows through the opening 160 in the blow pipe 124 to the nozzle 140 and past the aspirator 180 location. This additional or secondary air is drawn in by lower pressure existing near the aspirator 180. An area of low pressure is created by the fast flow of the air discharged from the opening 160 in the blow pipe 124 through the nozzle 140 and across the aspirator 180 (primary air). The fast flowing primary air pulls the additional (secondary) air through the aspirator 180. These two airstreams combine to increase total flow and create the "enhanced" reverse cleaning pulse-jet delivered from the second end portion 144 (FIG. 6) of the nozzle 140. This enhanced flow out of the nozzle 140 is more than the primary air delivered to the nozzle through the opening 160 in the blowpipe 124.

The large separation distance between the discharge of the nozzle 140 and the plenum 66 of the filter 40 encourages additional entrainment of air, increasing the total reverse flow cleaning pulse volume to two to five times that of the air volume delivered from the opening 160 in the blow pipe 124. Thus, the aspirator 180 increases the cleaning jet effectiveness of the fluid from the nozzle 140 in the range of 3% to 40% and preferably in the range of 10% to 30% to that of what would be delivered by air delivered only through the opening in the blow pipe 124.

An actuator (not shown) of the reverse pulse-jet cleaning system 100 provides a signal to open the pulse valve 120. When the valve 120 opens, compressed fluid flows from the manifold 122 through the valve and to the blowpipe 124. The fluid enters the nozzle 140 as a primary fluid jet. The primary fluid jet is then supplemented by secondary air flow from the aspirator 180. The enhanced cleaning pulse is directed into the plenum 66 such that the pulse fills the plenum 66 of the filter 40. This cleaning pulse allows maximum cleaning air to be directed into the filter 40 economically.

The reverse pulse-jet cleaning system 100 also includes a diffuser 200 associated with each nozzle 140. The diffuser 200 is permanently attached to at least one of the blowpipe 124 and the nozzle 140, such as by welding. The diffuser 200 directs a portion of the cleaning pulse to the proximal portion 50 of the filter 40 located adjacent to the tubesheet 24. This is traditionally the area of the filter 40 that is most difficult to effectively clean. That is because the intake air flow I (FIGS. 1-2 and 4-5) re-deposits particulates removed during the application of a cleaning pulse from the distal portion 52 of the filter 40 spaced from the tubesheet 24 onto the proximal portion 50 of the filter located adjacent the tubesheet. The diffuser 200 is positioned substantially centrally relative to the filter 40 as illustrated in FIG. 3, or on the axis A as illustrated in FIG. 5.

The diffuser 200 directs a portion of the cleaning pulse P1 to the proximal portion 50 of the filter 40 located closest to the tubesheet 24 that requires additional or special cleaning relative to the distal portion 52. Concurrently, the remainder or distal portion 52 of the filter 40 receives the remaining portion P2 of the cleaning pulse 40 that is required to clean the distal portion of the filter.

According to one aspect of the invention, the diffuser 200 has a pair of identical halves that are welded together. Each half of the diffuser 200 includes a mounting portion 202. The mounting portion 202 is permanently attached to the blowpipe 124 and the nozzle 140 by welds. It is important that anything downstream of the tubesheet 24 and filter 40 cannot detach and enter the equipment components located downstream, such as a gas turbine. Such equipment components would be costly to repair and suffer downtime when the equipment components are not generating power.

The mounting portion 202 of the diffuser 200 is illustrated as attached to the blowpipe 124 so as not to interfere with the fluid flow to the aspirator 180. That is, the mounting portion 202 is attached to the blowpipe 124 relative to the nozzle 140 so that it is spaced from the aspirators 180.

Each half of the diffuser 200 has a body portion 204 integrally formed as one piece with the mounting portion 202. The diffuser 200 has a cross-section, taken in a direction normal to its axial extent, substantially the same as the cross-section of the filter 40. For example, the diffuser 200 has a substantially conical shape when fully assembled, as illustrated in FIGS. 6-9.

The diffuser 200 further includes a horn-shaped vent notch 222 in each body portion 204 to direct another portion of the cleaning pulse P2 into a distal portion 52 of the filter 40 located away from the tubesheet 24. Each vent notch 222 has an opening 224 through which the other portion P2 flows through the body portion 204 and of the cleaning pulse and is directed into a distal portion 52 of the filter. It should be apparent that the diameter D1 (FIG. 9) and length D2 of the conical body portion 204, spacing from the nozzle 140, spacing from the tubesheet 24 as well as the dimensions and shape of the vent notches 222 and openings 224 are selected to establish the intensity of the portions of the cleaning pulses P1, P2 and the portions 50, 52 of the filter 40 that they are concentrated at.

Another aspect of the invention is a method of cleaning the filter 40 mounted to the tubesheet 24. The filter 40 defines the upstream side 46 at which particulates are separated from a fluid stream passing through the filter. The downstream side 48 of the filter 40 is substantially free of the particulates. The blowpipe 124 supplies pressurized fluid. A portion of the pressurized fluid is directed from an outlet end portion 144 of the nozzle 140 into the plenum 66 defined by the downstream side 48 of the filter 40 to dislodge particulates from the upstream side 46.

The aspirator 180 delivers an additional volume of fluid than is delivered to the nozzle 140 from the opening 160 in the blowpipe 124. The aspirator 180 is formed in the nozzle 140 in the inlet end portion 142 of the nozzle. A portion P1 of the cleaning pulse is directed by the diffuser 200 to a proximal portion 50 of the filter 40 located adjacent to the tubesheet 24 by the diffuser 200.

The method also includes the step of providing a diffuser 200 with a body portion 204 having a vent notch 222. Another cleaning pulse portion P2 is directed to the distal end 52 of the filter 40 by the vent notch 222. The cleaning pulse portion P2 is essentially not deflected by the body portion 204 of the difference 200 as it exits the nozzle 140. The cleaning pulse portion P2 flows through the opening 224 in the vent notch 222.

Figure 13:
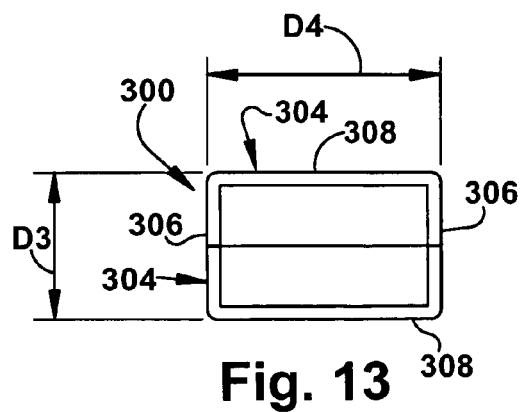
FIG. 13 is an end view of the diffuser, taken along the line 13-13 in FIG. 12.

According to another aspect of the invention, a diffuser 300 (FIGS. 10-13) has a pair of identical halves that are welded together. The diffuser 300 includes a mounting portion 302. The mounting portion 302 is permanently attached to the blowpipe 124 and the nozzle 140 by welds. Each half of the diffuser 300 has a body portion 304 that is integrally formed as one piece with a respective mounting portion 302. For example, the diffuser 300 has a substantially rectangular cross-section when fully assembled, as illustrated in FIG. 13.

The body portion 304 of the diffuser 302 has a non-deflecting surface 306 and a deflecting surface 308. There is no redirection of the cleaning pulse portion P2 delivered from the nozzle 140 as it travels along the non-deflecting surface 306. The cleaning pulse portion P1 delivered from the nozzle 140 that travels along or directed at the deflecting surface 308 is directed at the proximal portion 50 of the filter 40 located closest to the tubesheet 24. It should be apparent that the largest dimension D3 (FIG. 13) of the non-deflecting surface 306 and largest dimension D4 of the deflecting surface 308 and spacing from the nozzle 140, are selected to establish the intensity of the portions of the cleaning pulses P1, P2 and the portions 50, 52 of the filter 40 that they are concentrated at.

Figure 14:
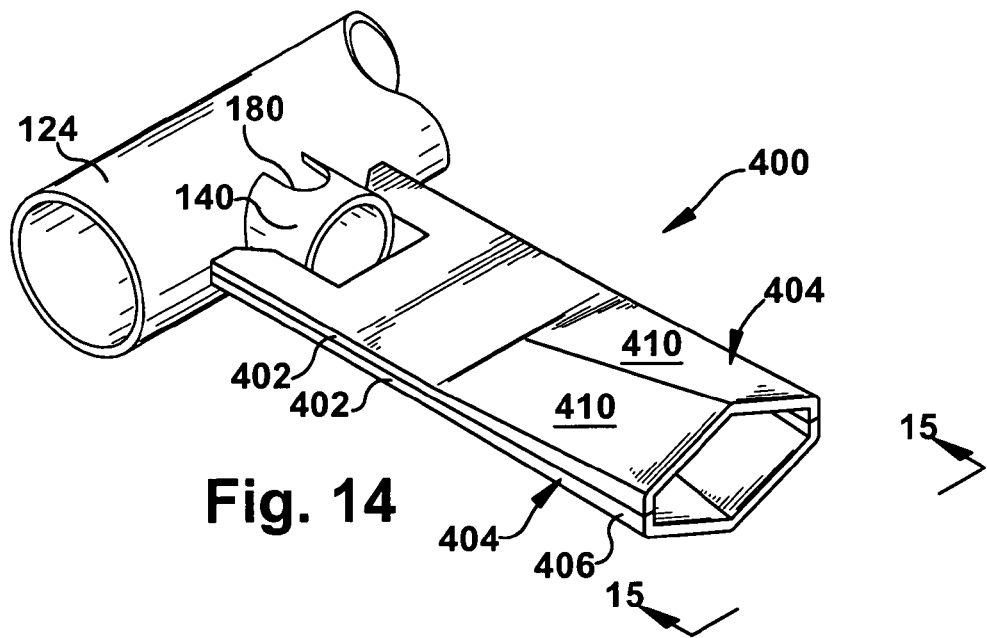
FIG. 14 is an enlarged perspective view of a nozzle and diffuser of the filter cleaning system according to yet another aspect of the invention.
Figure 15:
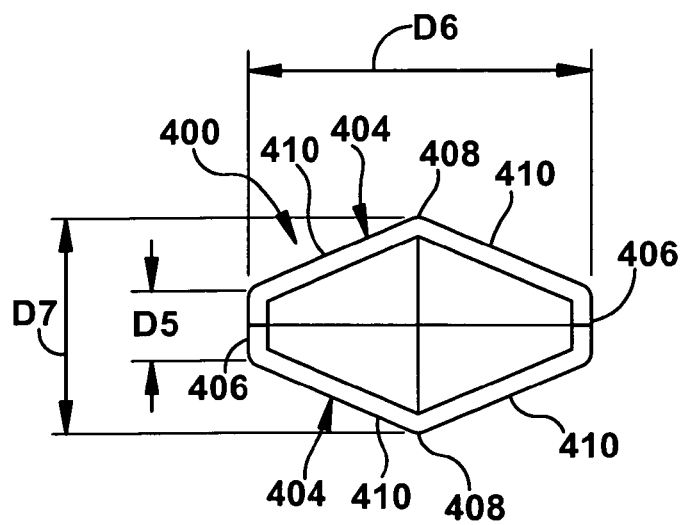
FIG. 15 is an end view of the diffuser, taken along the line 15-15 in FIG. 14.

According to yet another aspect of the invention, the diffuser 400 (FIGS. 14-15) has a pair of identical halves that are welded together. The diffuser 400 includes a mounting portion 402. The mounting portion 402 is permanently attached to the blowpipe 124 and the nozzle 140 by welds. Each half of the diffuser 400 has a body portion 404 integrally formed as one piece with the mounting portion 402. The diffuser 400 has a substantially diamond-shaped cross-section, as viewed in FIG. 15.

The body portion 404 of the diffuser 402 has a non-deflecting surface 406 and deflecting surfaces 410. There is no redirection of the cleaning pulse portion P2 delivered from the nozzle 140 as it travels along the non-deflecting surface 406. The cleaning pulse portion P1 delivered from the nozzle 140 that travels along or directed at the deflecting surfaces 410 is directed at the proximal portion 50 of the filter 40 located closest to the tubesheet 24. The deflecting surfaces 410 of each body portion meet at an apex 408. It should be apparent that the largest dimension D5 (FIG. 15) of the non-deflecting surface 406, the largest dimension D6 of the deflecting surfaces 410, and largest dimension D7 of the deflecting surfaces 410 taken across the apex 408 and spacing from the nozzle 140, are selected to establish the intensity of the proportions of the cleaning pulses P1, P2 and the portions 50, 52 of the filter 40 that they are concentrated at.

The aspects described above and illustrated in FIGS. 6-15 are directed to diffusers 200, 300, 400 that are symmetrical. It should be apparent that diffusers with an asymmetrical configuration can be adapted for use. For example, an asymmetrical diffuser is contemplated that would bias a greater portion of the cleaning pulses P1, P2 towards the portions of the filter 40 that are oriented upwards. This is where a relatively larger proportion of the particulates may be found due to gravity.

From the above description of at least one aspect of the invention, those skilled in the art will perceive improvements, changes and modifications. Such improvements, changes and modifications within the skill of the art are intended to be covered by the appended claims.

Having described at least one aspect of the invention, what is claimed is:

1. A cleaning system for use with a filter mounted to a tubesheet and in which the filter has an upstream side where particulates are separated from a fluid stream passing through the filter and collected and a downstream side that is substantially free of the particulates, the cleaning system comprising:

a blowpipe for supplying a pressurized fluid and having an opening therein;

a one-piece nozzle made from a tubular member having a substantially constant cross-section extending along the length of the member, the nozzle being attached to the blowpipe at a first end portion adjacent the opening in the blowpipe, the nozzle in fluid communication with the blowpipe to provide a cleaning pulse of the pressurized fluid from a second opposite end portion of the nozzle to the downstream side of the filter to dislodge particulates from the upstream side; and an aspirator formed in the first end portion of the nozzle at an upstream location spaced from the second end portion of the nozzle, the aspirator enabling an additional volume of fluid to be delivered from the second end portion of the nozzle than is delivered from the opening in blowpipe, at least a portion of the aspirator located along the nozzle upstream of the opening in the blowpipe.

2. The cleaning system of claim 1 further including a diffuser fixed to at least one of the blowpipe and the nozzle, the diffuser for directing a portion of the cleaning pulse to a proximal portion of the filter located adjacent to the tubesheet.

3. The cleaning system of claim 2 wherein the diffuser has a substantially conical shape.

4. The cleaning system of claim 2 wherein the diffuser further includes a body with a portion to direct another portion of the cleaning pulse into a distal portion of the filter spaced from the proximal portion.

5. The cleaning system of claim 4 wherein the portion of the body to direct another portion of the cleaning pulse into a distal portion of the filter includes a notch portion formed in the body and an opening in the notch portion.

6. The cleaning system of claim 2 wherein the diffuser has a substantially rectangular cross-section.

7. The cleaning system of claim 2 wherein the diffuser has a substantially diamond-shaped cross-section.

8. The cleaning system of claim 2 wherein the diffuser is permanently attached to the blowpipe.

9. The filter cleaning system of claim 2 wherein the diffuser is permanently attached to the nozzle.

10. A cleaning system for a gas turbine inlet filter mounted to a tubesheet and in which the filter has an upstream side where particulates are separated from a fluid stream passing through the filter and defining a downstream side substantially free of the particulates, the cleaning system comprising:

a blowpipe for supplying a pressurized fluid and having an opening;

a one-piece nozzle made from a tubular member having a substantially constant cross-section extending along the length of the member, the nozzle being permanently attached to the blowpipe at a first end portion adjacent the opening in the blowpipe, the nozzle in fluid communication with the blowpipe to provide a cleaning pulse of the pressurized fluid from a second opposite end portion of the nozzle into the downstream side of the filter to dislodge particulates from the upstream side;

an aspirator formed in the first end portion of the nozzle at an upstream location spaced from the second end portion of the nozzle, the aspirator enabling an additional volume of fluid to be delivered from the second end portion of the nozzle than is delivered from the opening in the blowpipe, at least a portion of the aspirator located along the nozzle upstream of the opening in the blowpipe; and a diffuser permanently fixed to at least one of the blowpipe and the nozzle, the diffuser directing a portion of the cleaning pulse to a proximal portion of the filter located adjacent to the tubesheet.

11. The cleaning system of claim 10 wherein the diffuser has a substantially conical shape.

12. The cleaning system of claim 10 wherein the diffuser further includes a body with a portion to direct another portion of the cleaning pulse into a distal portion of the filter spaced from the proximal portion.

13. The filter cleaning system of claim 10 wherein the diffuser is permanently attached to the blowpipe and the nozzle.

14. The cleaning system of claim 10 wherein the diffuser has a substantially rectangular cross-section.

15. The cleaning system of claim 10 wherein the diffuser has a substantially diamond-shaped cross-section.

16. A method of cleaning a filter mounted to a tubesheet and in which the filter has an upstream side where particulates are separated from a fluid stream passing through the filter and a downstream side substantially free of the particulates, the method comprising the steps of:

supplying pressurized fluid in a blowpipe having an opening;

directing a portion of the pressurized fluid from an outlet end portion of a nozzle into the downstream side of the filter to dislodge particles from the upstream side, the nozzle being one-piece and made from a tubular member having a substantially constant cross-section extending along the length of the member, the nozzle being permanently attached to the blowpipe at an opposite inlet end portion adjacent the opening in the blowpipe, the inlet end portion of the nozzle in fluid communication with the blowpipe; and delivering a cleaning pulse from the nozzle to the downstream side of the filter to dislodge particulates from the upstream side, the cleaning pulse comprising fluid that is directed to the nozzle from the blowpipe and an additional volume of fluid through an aspirator, the aspirator being formed in the inlet end portion of the nozzle so that at least a portion of the aspirator is located along the nozzle upstream of the opening in the blowpipe.

17. The method of claim 16 further including the step of diffusing a portion of the cleaning pulse to a proximal portion of the filter located adjacent to the tubesheet.

18. The method of claim 17 wherein the diffusing step includes providing a diffuser selected from the group of substantially conical shaped, substantially rectangular cross-section and substantially diamond-shaped cross-section.

19. The method of claim 17 wherein the diffusing step includes providing a diffuser with a body having a portion to direct another portion of the cleaning pulse into a distal end of the filter.

* * * * *